Feb. 18, 1941.   F. RIESTERER   2,232,407
TRACTOR HITCH
Filed April 29, 1940   2 Sheets-Sheet 1
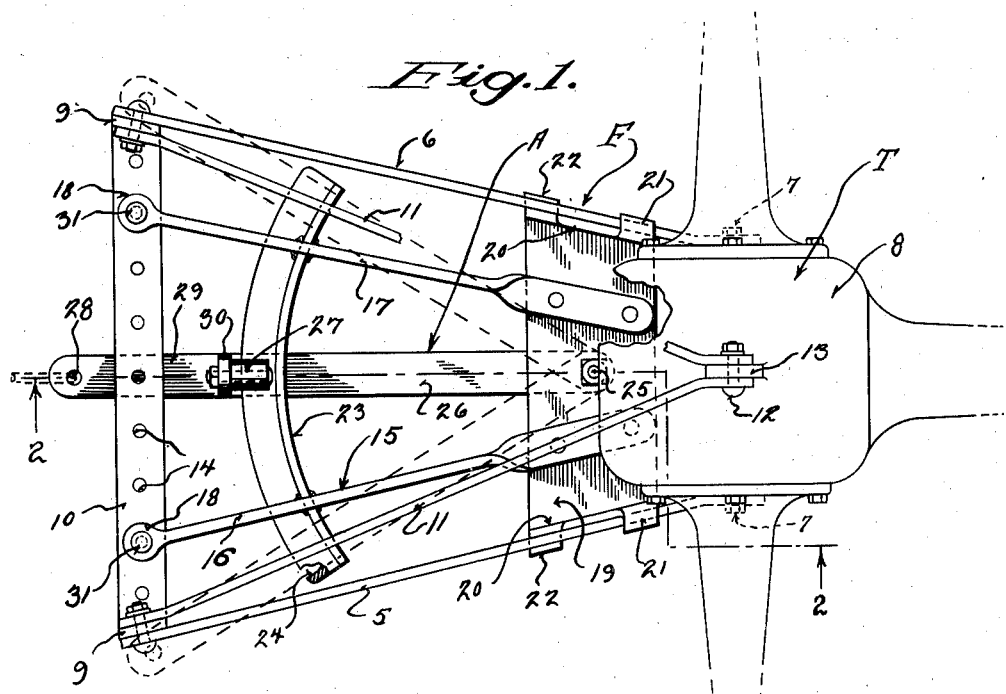
Fig. 1.
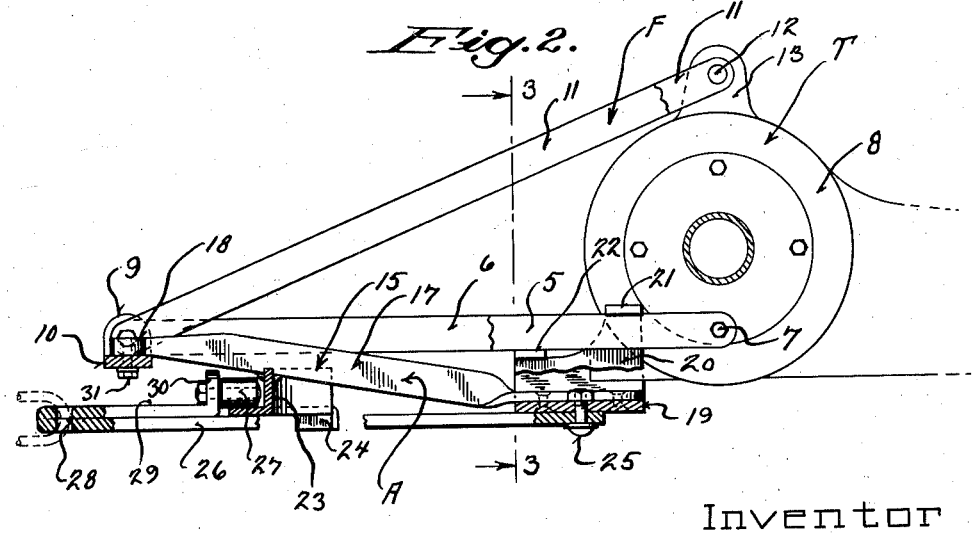
Fig. 2.
Inventor
F. Riesterer
By
Attorneys

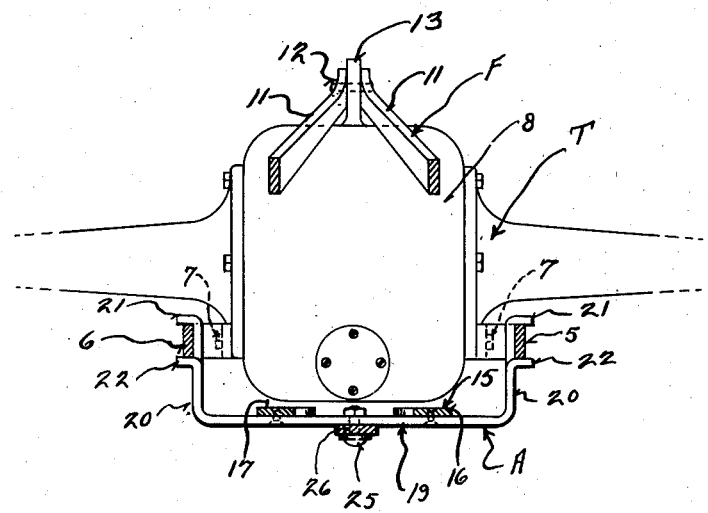
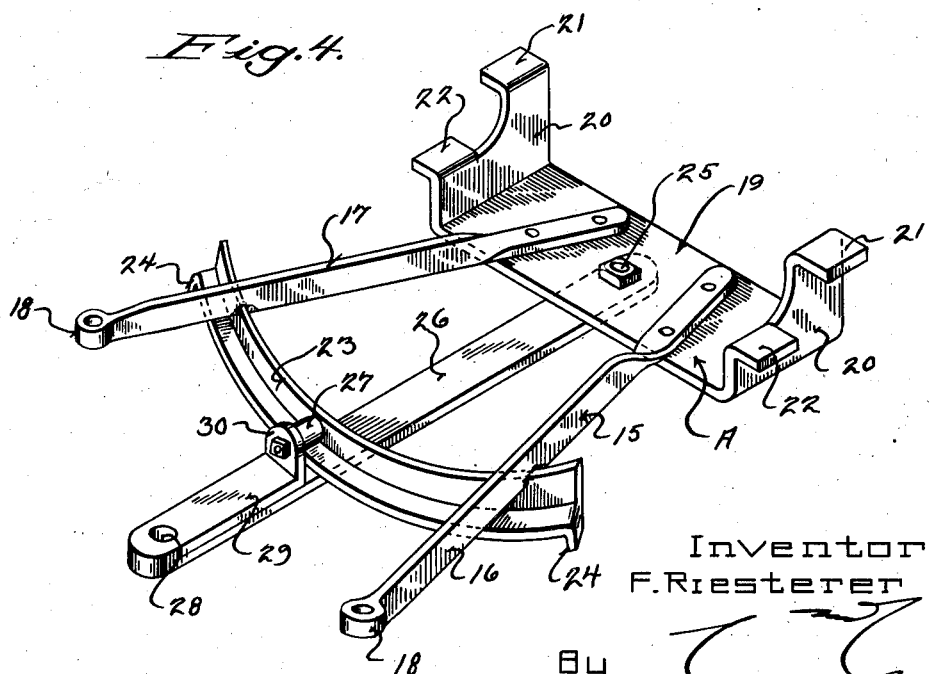

Patented Feb. 18, 1941

2,232,407

UNITED STATES PATENT OFFICE 2,232,407

TRACTOR HITCH

Frank Riesterer, Eaton, Wis.

Application April 29, 1940, Serial No. 332,331

4 Claims. (Cl. 280—33.12)

This invention appertains to tractors, and more particularly to a novel hitch for connecting farm implements to a tractor.

Much difficulty is experienced in making turns at the ends of fields and the like, and the implements tend to whip around while making turns instead of properly tracking behind the tractor.

One of the primary objects of my invention is to provide novel means for connecting the implements with the tractor, whereby short turns can be successfully made, and whereby the implements will properly follow behind the tractor, so that plowing can be accomplished with the expenditure of a minimum amount of time and effort and without waste of ground.

Another salient object of my invention is the provision of a novel hitch embodying a frame readily attachable to and removable from a supporting frame connected with the tractor, said hitch including a swinging drawbar to which the farm implements are connected.

A further important object of my invention is to provide means whereby the drawbar can be locked in an adjusted position at one side of the longitudinal axis of the tractor for sidehill plowing and the like.

A still further object of my invention is to provide a novel hitch of the above character, which will be durable and efficient in use, one that will be simple and easy to manufacture, and one which can be placed upon the market at a small cost.

With these and other objects in view, the invention consists in the novel construction, arrangement, and formation of parts, as will be hereinafter more specifically described, claimed, and illustrated in the accompanying drawings, in which drawings:

Figure 1 is a top plan view of my improved hitch, showing the same connected to a supporting frame mounted upon the rear end of a tractor.

Figure 2 is a central, longitudinal, sectional view taken on the line 2—2 of Figure 1, looking in the direction of the arrows.

Figure 3 is a transverse, sectional view taken on the line 3—3 of Figure 2, looking in the direction of the arrows.

Figure 4 is a perspective view of my novel hitch attachment for detachable connection with a supporting frame on a tractor.

Referring to the drawings in detail, wherein similar reference characters designate corresponding parts throughout the several views, the letter A generally indicates my novel hitch attachment for connection with a supporting frame F connected with a popular type of light farm tractor T.

A popular light tractor (the Ford tractor) has been placed on the market with a device known as the "Ferguson" hitch or system of connecting wheelless farm implements with the tractor. The frame F can be employed for connecting usual types of farm implements with the light tractor, and this frame F can be either rigidly connected to the chassis of the tractor or to parts of the Ferguson hitch.

For the purpose of illustration, I have shown the supporting frame F rigidly connected with the chassis of the tractor T, and, as shown, the frame F includes lower diverging tension bars 5 and 6 connected by certain bolts 7 to the transmission housing 8 of the tractor. The rear ends of the bars 5 and 6 are firmly bolted to the upturned ends 9 of a transversely extending hitch bar 10. The upturned ends 9 of the hitch bar 10 also have firmly secured thereto upwardly extending, converging tension bars 11, which can be firmly connected by means of a bolt to a lug 13 on the transmission housing 8 of the tractor. The hitch bar 10 is provided with the usual openings 14 for receiving plow coupling pins or the like.

My novel hitch attachment A comprises a rigid frame 15 including rearwardly diverging arms 16 and 17 terminating in eyes 18. The forward ends of the arms 16 and 17 are riveted or otherwise secured to a cross-hanger plate or bracket 19. This cross-hanger plate or bracket 19 has formed on its ends upstanding side walls or legs 20, and each of these legs carries laterally extending feet 21 and 22 arranged in different horizontal planes. Welded or otherwise rigidly secured to the arms 16 and 17 in rear of the cross-hanger plate or bracket 19 is an arcuate guide bar 23, which is preferably formed from angle iron. The ends of the guide bar 23 are provided with depending stop ears 24.

Pivotally mounted for swinging movement on a pivot pin 25 is the drawbar 26. The drawbar is arranged between the arms 16 and 17 and carries an anti-friction roller 27 for engagement with the horizontal flange of the angle-shaped guide bar 23. The rear end of the drawbar 26 has formed therein an opening 28 for receiving the implement coupling pins or the like. The pivot pin 25 is supported by the cross plate or bracket 19 at the central portion thereof between the arms 16 and 17.

By referring to Figure 4, it will be noted that the rear end of the drawbar 26 is bent back upon itself, as at 29, and is provided with an upstanding lug 30, and this lug carries the anti-friction roller 27.

In using my hitch attachment A, the cross-hanger plate or bracket 19 is placed between the diverging frame bars 5 and 6 of the frame F in such a manner that the feet 21 will engage the upper edges of these bars 5 and 6, and the feet 22 will engage the lower edges of the bars 5 and 6.

The entire attachment is shoved forwardly toward the transmission housing 8 until the hanger plate or bracket 19 wedges itself firmly between the bars 5 and 6, at which time the eyes 18 on the arms 16 and 17 will register with certain openings 14 on the hitch bar 10, and the arms 16 and 17 are then firmly secured to the hitch bar 10 by means of bolts 31 passing through the eyes 18 and the hitch bar 10.

Thus, my hitch attachment A is firmly and rigidly connected to the frame F by the mere use of two connecting bolts.

The implements can now be readily connected to the drawbar 26, and as the drawbar is mounted for free swinging movement, the implements will readily follow behind the tractor, so that short turns can be made at the ends of a field. This will simplify the plowing operation and save ground.

If preferred, means (not shown) can be provided for locking the drawbar 26 in angular positions relative to the hitch bar 10, so that the attachment can be used in sidehill plowing and the like.

From the foregoing description it can be seen that I have provided an exceptionally simple and durable hitch attachment for a popular type of light farm tractor, which will permit the proper tracking of farm implements in rear of the tractor.

Changes in details may be made without departing from the spirit of the scope of my invention, but what I claim as new is:

1. The combination with a tractor including an axle housing and a differential housing, a supporting frame connected with the tractor including a pair of rearwardly diverging lower bars connected at their forward ends to the tractor below the axle housing, and a pair of rearwardly diverging top bars connected at their forward ends to the tractor above the axle housing, a transversely extending hitch bar rigidly secured to the rear ends of all of the bars, of a hitch attachment for the tractor including a transversely extending hanger plate having inclined side walls and outwardly directed, laterally extending feet arranged in different planes, certain of the feet engaging the upper edges of the lower bars, and certain other of the feet engaging the lower edges of the lower bars, arms rigidly secured to the plate and detachably connected with the hitch bar, and a drawbar pivotally secured to the central portion of the hanger plate and extending in rear of the hitch bar.

2. The combination with a tractor including an axle housing and a differential housing, a supporting frame connected with the tractor including a pair of rearwardly diverging lower bars connected at their forward ends to the tractor below the axle housing, and a pair of rearwardly diverging top bars connected at their forward ends to the tractor above the axle housing, a transversely extending hitch bar rigidly secured to the rear ends of all of the bars, of a hitch attachment for the tractor including a transversely extending hanger plate having inclined side walls and outwardly directed, laterally extending feet arranged in different planes, certain of the feet engaging the upper edges of the lower bars, and certain other of the feet engaging the lower edges of the lower bars, arms rigidly secured to the plate and detachably connected with the hitch bar, a drawbar pivotally secured to the central portion of the hanger plate and extending in rear of the hitch bar, an arcuate track guidebar secured to the arms at a point spaced from the hanger plate, and an anti-friction roller on the pull bar engaging the track guidebar.

3. As a new article of manufacture, a hitch attachment for tractors comprising, a hanger plate of a substantially U-shape including upstanding, angularly related side walls and spaced laterally extending feet formed on each side wall arranged in different horizontal planes, rearwardly extending supporting arms rigidly secured to the plate having attaching members on their rear ends, an arcuate guide track secured to the arms in spaced relation to the plate, and intermediate the sides of the arms a pull bar pivotally secured to the plate between the arms, and a supporting guide roller on the pull bar engaging the arcuate guide track.

4. The combination with a tractor including a differential housing and an axle housing, a supporting frame including rearwardly diverging lower bars and rearwardly diverging upper bars, the forward ends of the lower bars being connected with the tractor below the axle housing, the forward ends of the upper bars being connected to the tractor above the axle housing, and a transversely extending hitch bar connected to the ends of all of the bars, of a hitch attachment for the tractor including a transversely extending hanger plate having side walls engaging against the sides of the lower bars, spaced right-angularly extending feet on each side wall arranged in different horizontal planes and engaging the upper and lower edges the lower bars below the axle housing, a compression member extending from the hitch bar to the hanger plate, and a drawbar tension member extending rearwardly from and pivotally secured to the hanger plate adjacent the center of the axle, and a guide carried by the hitch attachment for the drawbar tension member.

FRANK RIESTERER.